US011722235B2

(12) United States Patent
Kawahara et al.

(10) Patent No.: US 11,722,235 B2
(45) Date of Patent: Aug. 8, 2023

(54) OPTICAL BRANCH INSERTION DEVICE AND OPTICAL BRANCH INSERTION METHOD

(71) Applicant: Nippon Telegraph and Telephone Corporation, Tokyo (JP)

(72) Inventors: Hiroki Kawahara, Musashino (JP); Takeshi Seki, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 94 days.

(21) Appl. No.: 17/435,269

(22) PCT Filed: Mar. 9, 2020

(86) PCT No.: PCT/JP2020/010115
§ 371 (c)(1),
(2) Date: Aug. 31, 2021

(87) PCT Pub. No.: WO2020/189386
PCT Pub. Date: Sep. 24, 2020

(65) Prior Publication Data
US 2022/0149970 A1    May 12, 2022

(30) Foreign Application Priority Data
Mar. 20, 2019  (JP) .................................. 2019-052479

(51) Int. Cl.
*H04J 14/02*    (2006.01)

(52) U.S. Cl.
CPC .............................. *H04J 14/0212* (2013.01)

(58) Field of Classification Search
CPC ................................ H04J 14/0212; H04J 3/08
See application file for complete search history.

(56) References Cited

U.S. PATENT DOCUMENTS 5,583,958 A  * 12/1996  Yanagawa .............. G02B 6/125
                                                      385/24
9,520,959 B2 * 12/2016  Matsukawa ......... H04J 14/0213
(Continued)

FOREIGN PATENT DOCUMENTS

| EP | 2615755 | 7/2013 | |
| EP | 2615755 A1 * | 7/2013 | .......... H04J 14/0212 |
| EP | E P-2757714 A1 * | 7/2014 | ............ H04J 14/021 |

OTHER PUBLICATIONS

Sakamaki et al., "Optical switch technology that realizes a more flexible optical node," NTT Technology Journal, 2013, 25(11):16-20, 11 pages (with English translation).

*Primary Examiner* — Tanya T Motsinger
(74) *Attorney, Agent, or Firm* — Fish & Richardson P.C.

(57) ABSTRACT

The present invention is to provide an optical add/drop multiplexing device capable of realizing a configuration in which many transponders can be connected at low cost. An optical add/drop multiplexing device 30A includes branch function units 34a to 34d connected to each of WSSs 22a to 22d connected to respective routes 1 to D having a plurality of optical fibers and dropping optical signals having a plurality of wavelengths among the optical signals having the respective wavelengths transmitted by wavelength division multiplexing. The optical add/drop multiplexing device includes C-function units 35a to 35d configured to transmit the optical signals branched by the branch function units 34a to 34d to a plurality of transponders. The optical add/drop multiplexing device includes optical couplers 36a to 36d each connected between a set of K WSSs 22c and 22d each having 1 input and M outputs and one of the branch function units 34a, K being a number of 2 or more, the number of optical couplers being equal to or greater than a positive integer obtained by dividing a numerical value D(M−D) by K, the numerical value being (Continued)

obtained by multiplying the number (M–D) of optical signals dropped by each of the WSSs 22c and 22d by the number D of all of the WSSs 22a to 22d. The optical coupler 36a couples optical signals of different wavelengths dropped by a set of WSSs into one optical signal and outputs the coupled optical signal to the branch function unit 34a.

3 Claims, 7 Drawing Sheets

(56) References Cited

U.S. PATENT DOCUMENTS

| | | | | |
|---|---|---|---|---|
| 9,680,597 | B2* | 6/2017 | Takahashi | H04J 14/021 |
| 10,498,479 | B2* | 12/2019 | Schimpe | H04J 14/0217 |
| 11,564,020 | B1* | 1/2023 | Xu | H01Q 25/008 |
| 2006/0098981 | A1* | 5/2006 | Miura | H04Q 11/0005 |
| | | | | 398/45 |
| 2009/0232497 | A1* | 9/2009 | Archambault | H04J 14/0217 |
| | | | | 398/50 |
| 2010/0034532 | A1* | 2/2010 | Ghelfi | H04J 14/0204 |
| | | | | 398/19 |
| 2011/0262143 | A1* | 10/2011 | Ji | H04J 14/0208 |
| | | | | 398/83 |
| 2015/0055952 | A1* | 2/2015 | Younce | H04J 14/0212 |
| | | | | 398/83 |
| 2015/0333835 | A1* | 11/2015 | Matsukawa | H04J 14/0227 |
| | | | | 398/83 |
| 2016/0099851 | A1* | 4/2016 | Archambault | H04B 10/07955 |
| | | | | 398/16 |
| 2016/0315701 | A1* | 10/2016 | Yuki | H04J 14/0212 |
| 2017/0230109 | A1* | 8/2017 | Kawai | H04Q 11/0005 |
| 2017/0250752 | A1* | 8/2017 | Yuki | H04Q 11/0062 |
| 2017/0279555 | A1* | 9/2017 | Schimpe | H04J 14/0217 |
| 2018/0219619 | A1* | 8/2018 | Takigawa | H04J 14/0297 |
| 2019/0165877 | A1* | 5/2019 | Way | H04Q 11/0005 |
| 2019/0238251 | A1* | 8/2019 | Chedore | H04Q 11/0005 |
| 2020/0007262 | A1* | 1/2020 | Chedore | H04J 14/0204 |
| 2020/0412475 | A1* | 12/2020 | Nagai | H04J 14/0202 |
| 2021/0219031 | A1* | 7/2021 | Kawahara | H04J 14/0217 |
| 2021/0320742 | A1* | 10/2021 | Jia | H04B 10/2569 |
| 2022/0149970 | A1* | 5/2022 | Kawahara | H04J 3/08 |

* cited by examiner

OPTICAL BRANCH INSERTION DEVICE AND OPTICAL BRANCH INSERTION METHOD

CROSS-REFERENCE TO RELATED APPLICATIONS

This application is a National Stage application under 35 U.S.C. § 371 of International Application No. PCT/JP2020/010115, having an International Filing Date of Mar. 9, 2020, which claims priority to Japanese Application Serial No. 2019-052479, filed on Mar. 20, 2019. The disclosure of the prior application is considered part of the disclosure of this application, and is incorporated in its entirety into this application.

TECHNICAL FIELD

The present invention relates to an optical add/drop multiplexing device as a ROADM (Reconfigurable Optical Add/Drop Multiplexer) that functions as a route switch for optical signals transmitted to a large-capacity optical network at a high speed by wavelength division multiplexing, and an optical add/drop multiplexing method.

BACKGROUND ART

A conventional optical add/drop multiplexing device connected to an optical transmission line of an optical network will be described with reference to FIG. 7. FIG. 7 is a block diagram showing a configuration of an optical transmission device 10 including the conventional optical add/drop multiplexing device. The optical transmission device 10 is interposed in the middle of routes 1, 2, 3, and D in which a plurality of optical fibers are bundled as an optical transmission line. In the description, it is assumed that optical signals are transmitted to the optical transmission lines from left to right of the drawing, and therefore the optical transmission lines are referred to as routes 1 to D. For example, D="4".

The optical transmission device 10 is installed in, for example, a building which is a relay point of the optical transmission line, and can freely assign optical signals with wavelengths $\lambda 1$ to $\lambda n$ subjected to wavelength division multiplexing (WDM) to any path of the optical transmission lines. The optical transmission device 10 includes a wavelength cross-connect device 20 connected in the middle of the routes 1 to D and an optical add/drop multiplexing device 30 connected to the wavelength cross-connect device 20.

The wavelength cross-connect device 20 includes D WSSs (Wavelength Selective Switch) 22a, 22b, 22c, and 22d provided on an input side and connected to the routes 1 to D via optical amplifiers 21, respectively, WSSs 23a, 23b, 23c, and 23d provided on an output side and connected to the WSSs 22a to 22d, respectively, and optical amplifiers 24 connected to output sides of the WSSs 23a to 23d, respectively. The WSSs 22a to 22d have a function of selecting an optical signal for each wavelength and adjusting an amount of attenuation.

Each of the WSSs 22a to 22d includes one input port (referred to as 1 input port) and M (for example, six) output ports (referred to as M output ports), that is, 1×M input and output ports. This is expressed as WSSs 22a to 22d with 1×M ports. The 1 input port of each of the WSSs 22a to 22d is connected to each of the routes 1 to D, and D output ports (referred to as D output ports) having the same number as the number of routes among the M output ports are connected to the WSSs 23a to 23d on the output side. Such a connection is represented by the WSS 22a and the WSS 23a.

(M−D) drop ports obtained by subtracting D from the M output ports of each of the WSSs 22a to 22d are connected to D(M−D) "for example, 4(6−4)=8" optical amplifiers 31 of the optical add/drop multiplexing device 30. The drop ports of each of the WSSs 22a to 22d drop (branch or drop) the optical signals transmitted through the respective routes 1 to D for each of the wavelengths $\lambda 1$ to $\lambda n$.

Each of the WSSs 23a to 23d on the output side includes, in addition to D input ports, add ports to which optical signals relayed by transponders 41a ... 41n, 42a ... 42n, 43a ... 43n, and 44a ... 44n (hereinafter, referred to as 41a to 44n) to be described below are added (inserted) via the optical add/drop multiplexing device 30.

The optical add/drop multiplexing device 30 includes a branch unit 32 to which output ports of the respective optical amplifiers 31 are connected, and a CD/CDC (Colorless and Directionless/Colorless, Directionless and Contentionless) unit 33.

The branch unit 32 includes D(M−D) branch function units 34a to 34h as optical couplers or WSSs. Each of the branch function units 34a to 34h includes one input port and A (two) output ports that are A-branched (for example, two-branched), that is, 1×A input and output ports.

The CD/CDC unit 33 includes D C-function units 35a to 35d which are any one of the optical couplers, WSSs, and MCSs (Multicast Switches). Each of the C-function units 35a to 35d includes D input ports and B (D or more) output ports, that is, D×B input and output ports. In general, the number B of output ports is preferably D or more. For example, it is assumed that the number B of output ports is 8. Further, the C-function units 35a to 35d form a CD/CDC function unit disclosed in claims.

Each set of the B (8) transponders 41a ... 41n, 42a ... 42n, 43a ... 43n, and 44a ... 44n are connected to each of the C-function units 35a to 35d. In other words, 32 transponders 41a to 44n (=8×4) are connected. Communication devices 51a ... 51n, 52a ... 52n, 53a ... 53n, and 54a ... 54n are connected to the transponders 41a to 44n, respectively, with the same number (32) as the number of transponders.

Optical fibers are bundled in each of the routes 1 to D to which the wavelength cross-connect device 20 is connected, and optical signals having a plurality of wavelengths $\lambda 1$ to $\lambda n$ are bundled for each of the optical fibers and transmitted. Each of the WSSs 22a to 22d drops the optical signal for each of the wavelengths $\lambda 1$ to $\lambda n$. The dropped optical signals having the wavelengths $\lambda 1$ to $\lambda n$ are input to the branch function units 34a to 34h of the branch unit 32 via the optical amplifiers 31.

Each of the branch function units 34a to 34h branches the input optical signal into two and outputs to each of the C-function units 35a to 35d of the CD/CDC unit 33. Here, assuming that the branch function units 34a to 34h are optical couplers, for example, the branch function unit 34a as the optical coupler branches an optical signal from the optical amplifier 31 into two and outputs the branched optical signals to the C-function units 35a and 35b.

Similarly, the branch function unit 34b as the optical coupler branches an optical signal into two and outputs the branched optical signals to the C-function units 35a and 35b, the branch function unit 34c branches an optical signal into two and outputs the branched optical signals to the C-function units 35a and 35b, and the branch function unit 34d branches an optical signal into two and outputs the branched optical signals to the C-function units 35a and 35b.

By such an output, all of the optical signals dropped by the respective WSSs 22a to 22d are input to the C-function unit 35a, and all of the optical signals dropped by the respective WSSs 22a to 22d are also input to the C-function unit 35b. Similarly, the optical signals are also input to the C-function units 35c and 35d.

On the other hand, similarly to the case of being optical couplers, even in the case of being WSSs, the branch function units 34a to 34h branch the optical signals from the optical amplifiers 31 into two and output to the C-function units 35a to 35d.

Here, a CD (Colorless and Directionless) function of the CD/CDC unit 33 is a function having both a Colorless function and a Directionless function, which will be described below.

The Colorless function is a function of freely assigning the wavelengths input and output to the ports by giving a variable wavelength function to a multiplexing and demultiplexing filter.

The Directionless function is a function of making it possible to freely set input and output routes of the transponders which are fixed in the conventional technique, due to higher functionality of centralized switches of the transponders.

In addition, the CDC (Colorless, Directionless and Contentionless) function of the CD/CDC unit 33 has three functions of the Colorless function and the Directionless function described above and a Contentionless function to be described below.

The Contentionless function is a function of eliminating a constraint condition when both of the Colorless function and the Directionless function are realized, that is, a constraint that two same wavelengths assigned to different routes in the same node cannot be accommodated.

In addition, the WSS includes two types of a Contention WSS and a Contentionless WSS. The CD/CDC unit 33 has the CD function When the Contention WSS is used, has the CDC function when the Contentionless WSS is used, and has the CDC function when the MCS is used.

The MCS distributes optical signals, which are WDM signals, dropped by the respective WSSs 22a to 22d and transmitted from the respective routes 1 to D, using splitters. The distributed WDM signals are selected by variable optical signal wavelength filters, and the selected optical wavelength signals are transmitted to the transponders 41a to 44n. The optical signals output in this way are relayed by the transponders 41a to 44n and are output to the communication devices 51a to 54n.

An example of such a technique includes a technique disclosed in Non-Patent Literature 1, for example.

CITATION LIST

Non-Patent Literature

Non-Patent Literature 1: Yohei SAKAMAKI and two others, "Optical switch technology that realizes more flexible optical nodes", NTT Technology Journal, Vol. 25, No. 11, pp. 16-20, 2013.

SUMMARY OF THE INVENTION

Technical Problem

By the way, in the optical add/drop multiplexing device 30 described above, more transponders can be connected as the number of C-function units 35a to 35d increases. However, in order to increase the number, it is necessary to increase the number of branches of each of the branch function units 34a to 34h on the input sides of the C-function units 35a to 35d. When optical couplers are used for the branch function units 34a to 34h, power of the optical signals output from the optical couplers is attenuated as the number of branches increases. Due to the attenuation, when the number of branches is increased to a predetermined number or more, the optical couplers cannot be used for the branch function units 34a to 34h.

Therefore, when the WSSs are used for the branch function units 34a to 34h, the power of the optical signals of the WSSs does not weaken even when the number of output branches is increased. However, since the WSS is expensive, there is a problem in that the cost of the optical add/drop multiplexing device 30 increases as the number of output branches increases.

In the CD/CDC unit 33, the optical signals dropped by all of the WSSs 22a to 22d connected to the D routes 1 to D are input to D input ports of one C-function unit (for example, the C-function unit 35a). For this reason, as the number of routes 1 to D increases, the number D of input ports also increases. When the number D of input ports increases, the loss of the optical signal power increases when the optical coupler is applied to the C-function unit 35a. Further, considering that the WSS or the MCS is applied to the C-function unit 35a, since the expensive WSS or the MCS is mounted on the C-function unit 35a which requires the input and output ports with multi-inputs D and multi-outputs B, the cost increases. As a result, there is a problem in that the cost of the optical add/drop multiplexing device 30 increases.

An object of the present invention, which has been made in view of such circumstances, is to provide an optical add/drop multiplexing device and an optical add/drop multiplexing method capable of realizing a configuration in which many transponders can be connected, at low cost.

Means for Solving the Problem

As means for solving the problem, an invention according to claim 1 provides an optical add/drop multiplexing device including: branch function units connected to each of WSSs (Wavelength Selective Switches) connected to respective routes having a plurality of optical fibers and dropping optical signals having a plurality of wavelengths among the optical signals having the respective wavelengths transmitted through the optical fibers by wavelength division multiplexing; CD/CDC (Colorless and Directionless/Colorless, Directionless and Contentionless) function units configured to transmit the optical signals branched by the branch function units to a plurality of transponders; and optical couplers each connected between a set of K WSSs each having 1 input port and M output ports and one of the branch function units, K being a number of 2 or more, the number of optical couplers being equal to or greater than a positive integer obtained by dividing a numerical value D(M−D) by K, the numerical value being obtained by multiplying the number (M−D) of optical signals dropped by each of the WSSs by the number D of all of the WSSs, wherein the optical coupler couples optical signals of different wavelengths dropped by a set of WSSs connected to the optical coupler into one optical signal and outputs the coupled optical signal to the branch function unit.

An invention according to claim 4 provides an optical add/drop multiplexing method of an optical add/drop multiplexing device including branch function units connected to each of WSSs connected to respective routes having a plurality of optical fibers and dropping optical signals having a plurality of wavelengths among the optical signals having the respective wavelengths transmitted through the optical fibers by wavelength division multiplexing and CD/CDC function units configured to transmit the optical signals branched by the branch function units to a plurality of transponders, the optical add/drop multiplexing device including optical couplers each connected between a set of K WSSs each having 1 input port and M output ports and one of the branch function units, K being a number of 2 or more, the number of optical couplers being equal to or greater than a positive integer obtained by dividing a numerical value D(M−D) by K, the numerical value being obtained by multiplying the number (M−D) of optical signals dropped by each of the WSSs by the number D of all of the WSSs, and one of the branch function units, the optical coupler executing a step of coupling optical signals of different wavelengths dropped by a set of WSSs connected to the optical coupler into one optical signal and outputting the coupled optical signal to the branch function unit.

According to the configuration of claim 1 and the method of claim 4, the following operational effects can be obtained. Conventionally, the branch function units is connected to paths of the plurality of optical signals dropped by the respective WSSs. In other words, the number of branch function units to be used is 8 represented by a numerical value D(M−D) "4(6−4)" obtained by multiplying the number (M−D) "for example, 6−4" of optical signals dropped by each of the WSSs by the number D "for example, 4" of all of the WSSs.

In the present invention, "4" optical couplers equal to or greater than a positive integer "4" obtained by dividing the numerical value D(M−D) "8" by a set of numbers K (for example, K=2) are connected to a set of WSSs with K=2 and one branch function unit. Since the branch function units are connected to two each optical couplers, respectively, the number of branch function units can be reduced to two, which is half of the conventional 8 branch function units. In other words, the device cost of the branch function units using expensive WSSs can be significantly reduced to half, for example.

Conventionally, when the optical couplers are used for the branch function units, as the number of output branches of the branch function units connected to the input ports of the CD/CDC function units increases, power of the optical signals output from the optical couplers is attenuated. For this reason, the optical coupler cannot be used for the branch function units. However, in the present invention, since the number of branch function units can be reduced as described above, the number of output branches of the branch function units on the input ports of the CD/CDC function units is reduced. Therefore, inexpensive optical couplers can be used for the branch function units such that the power of the output optical signals is not attenuated, thereby the device cost can be reduced.

As described above, since the number of output branches of the branch function units on the input ports of the CD/CDC function units can be reduced, the number of input ports can be reduced. Due to the reduction in the number of input ports, the loss of the power of the optical signals from the optical couplers can be reduced when the optical couplers are used for the CD/CDC function units. For this reason, inexpensive optical couplers can be used for the CD/CDC function unit, and the device cost can be reduced.

Therefore, it is possible to realize a configuration in which many transponders can be connected to the optical add/drop multiplexing device.

An invention according to claim 2 provides an optical add/drop multiplexing device including: branch function units connected to each of WSSs connected to respective routes having a plurality of optical fibers and dropping optical signals having a plurality of wavelengths among the optical signals having the respective wavelengths transmitted through the optical fibers by wavelength division multiplexing; CD/CDC function units configured to transmit the optical signals branched by the branch function units to a plurality of transponders; and selectors each connected between a set of K WSSs each having 1 input port and M output ports and one of the branch function units, K being a number of 2 or more, the number of selectors being equal to or greater than a positive integer obtained by dividing a numerical value D(M−D) by K, the numerical value being obtained by multiplying the number (M−D) of optical signals dropped by each of the WSSs by the number D of all of the WSSs, wherein the selector selects any one of the optical signals dropped by the set of WSSs and outputs the selected optical signal to the branch function unit, and when one selector of the set of selectors selects an optical signal dropped by one of the set of WSSs, the other selector selects an optical signal dropped by the other WSS.

An invention according to claim 5 provides an optical add/drop multiplexing method of an optical add/drop multiplexing device including branch function units connected to each of WSSs connected to respective routes having a plurality of optical fibers and dropping optical signals having a plurality of wavelengths among the optical signals having the respective wavelength transmitted through the optical fibers by wavelength division multiplexing, and CD/CDC function units configured to transmit the optical signals branched by the branch function units to a plurality of transponders, the optical add/drop multiplexing device including selectors each connected between a set of K WSSs each having 1 input port and M output ports and one of the branch function units, K being a number of 2 or more, the number of selectors being equal to or greater than a positive integer obtained by dividing a numerical value D(M−D) by K, the numerical value being obtained by multiplying the number (M−D) of optical signals dropped by each of the WSSs by the number D of all of the WSSs, the selector executing a step of selecting any one of the optical signals dropped by the set of WSSs and outputting the selected optical signal to the branch function unit, wherein when one selector of the set of selectors selects an optical signal dropped by one of the set of WSSs, the other selector selects an optical signal dropped by the other WSS.

According to the configuration of claim 2 and the method of claim 5, since the optical couplers according to claim 1 are replaced with the selectors, the number of optical amplifiers and the number of branch function units can be reduced, and the number of input ports of each of the CD/CDC function units can be reduced, thereby the device cost can be reduced.

An invention according to claim 3 is the optical add/drop multiplexing device according to claim 1 or 2 in which an output port for drop is additionally installed for each of the WSSs, the optical add/drop multiplexing device including a bypass unit that is connected between the output port additionally installed and input ports of the CD/CDC function unit and transmits the optical signal dropped by each of the WSSs to the CD/CDC function unit.

According to such a configuration, since the bypass unit can be realized by a combination of at least two WSSs or optical couplers, the number of bypass units is extremely small compared to, for example, the number of WSSs constituting the CD/CDC function units. For this reason, the reduction of the device cost is not hindered. Accordingly, the cost of the entire optical add/drop multiplexing device can be reduced.

Effects of the Invention

According to the present invention, it is possible to provide an optical add/drop multiplexing device and an optical add/drop multiplexing method capable of realizing a configuration in which many transponders can be connected, at low cost.

DESCRIPTION OF EMBODIMENTS

Figure 1:
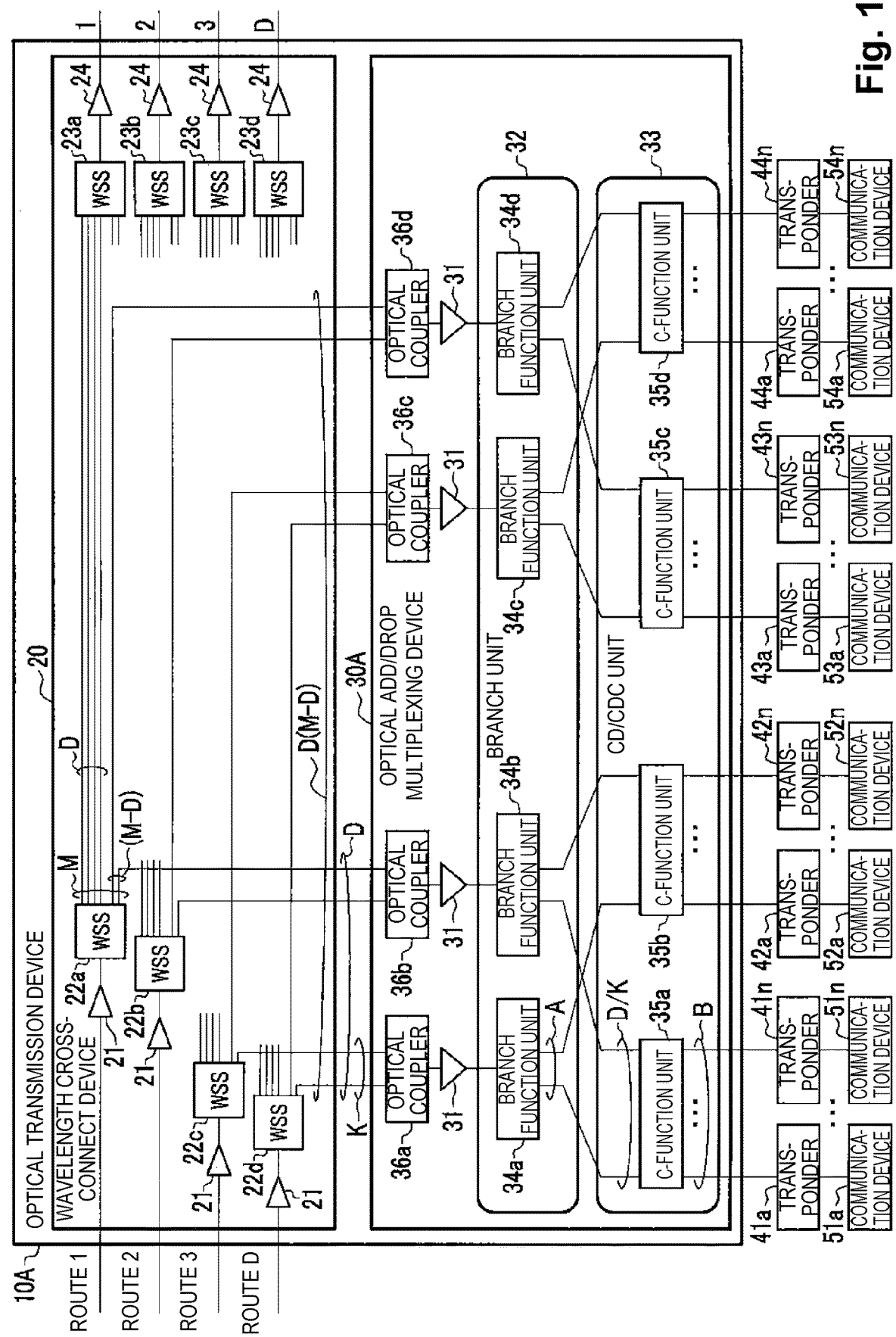
FIG. 1 is a block diagram showing a configuration of an optical transmission device including an optical add/drop multiplexing device according to a first embodiment of the present invention.

Embodiments of the present invention will be described below with reference to the drawings. However, components having corresponding functions in all the drawings of the description are denoted by the same reference numerals, and will be omitted as appropriate.

<Configuration of First Embodiment>

FIG. 1 is a block diagram showing a configuration of an optical transmission device including an optical add/drop multiplexing device according to a first embodiment of the present invention.

An optical add/drop multiplexing device 30A of an optical transmission device 10A shown in FIG. 1 differs from the conventional optical add/drop multiplexing device 30 (FIG. 7) in that optical couplers 36a, 36b, 36c, and 36d having K input ports and one output port (K×1) are connected between WSSs 22a to 22d of a wavelength cross-connect device 20 and optical amplifiers 31 on input sides of branch function units 34a to 34d, respectively. By the connection of the optical couplers 36a to 36d with K×1 ports, the number of optical amplifiers 31 and the number of branch function units 34a to 34d are reduced by 1/K. Further, the number of input ports of each of C-function units 35a to 35d is reduced to D/K, which is reduced from D (FIG. 7).

Figure 7:
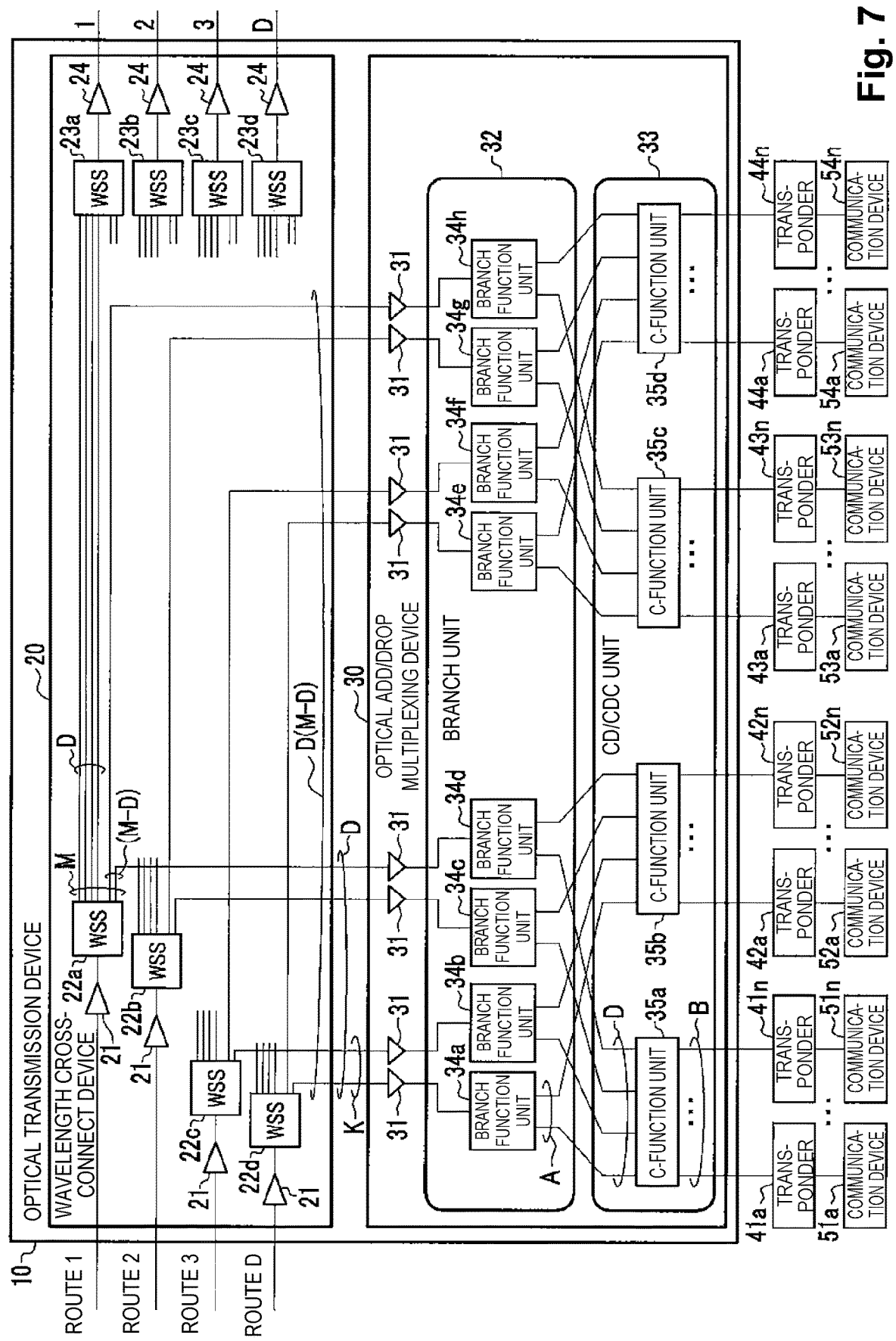
FIG. 7 is a block diagram showing a configuration of an optical transmission device including a conventional optical add/drop multiplexing device according to a second embodiment of the present invention.

In the optical transmission device 10A of FIG. 1, when D="4", M=6, A=2, and B=8 as illustrated in FIG. 7, relations of (M−D)=(6−4)=2 and D(M−D)=4(6−4)=8 are satisfied.

Here, the number K of input ports of each of the optical couplers 36a to 36d shown in FIG. 1 is 2 (K=2). In other words, the optical couplers 36a to 36d with 2×1 ports are used. In this case, since two routes dropped by the WSSs 22a to 22d are connected to the respective optical couplers 36a to 36d with 2×1 ports, the number of all the optical couplers 36a to 36d is 4 (=D(M−D)/K=8/2).

Since each of the optical couplers 36a to 36d has one output port, the number of optical amplifiers 31 is 4 and the number of branch function units 34a to 34d is also 4. In other words, the number of optical amplifiers 31 and the number of branch function units 34a to 34d in the embodiment are 4, which are half of the number of optical amplifiers 31 being 8 and the number of branch function units 34a to 34h being 8, respectively, in the conventional optical add/drop multiplexing device 30 (FIG. 7). Further, the number of input ports of each of the C-function units 35a to 35d is 2 (=D/K=4/2), which is half of the number of C-function units being 4 in the conventional device.

<Operation of First Embodiment>

An optical add/drop operation of the optical transmission device 10A including the optical add/drop multiplexing device 30A according to the first embodiment will be described below with reference to a flowchart shown in FIG. 2.

Figure 2:
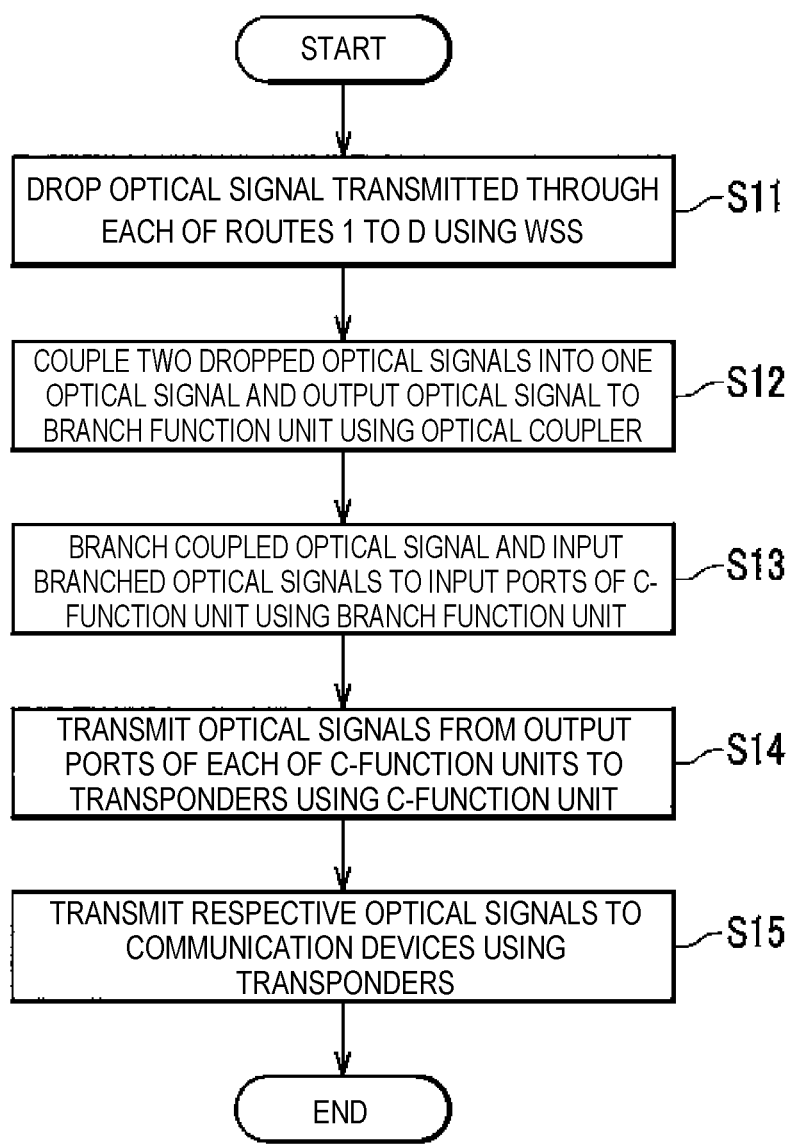
FIG. 2 is a flowchart illustrating an optical add/drop operation of the optical transmission device including the optical add/drop multiplexing device according to the first embodiment.

In step S11 shown in FIG. 2, a drop port of each of the WSSs 22a to 22d drops an optical signal, which is transmitted through each of routes 1 to D, for each of wavelengths $\lambda 1$ to $\lambda n$. The dropped optical signals are input to the optical couplers 36a to 36d, respectively.

In step S12, the optical coupler (for example, the optical coupler 36a) couples two optical signals having different wavelengths dropped by the respective WSSs 22c and 22d into one optical signal, and outputs the two coupled optical signals to the branch function unit 34a via the optical amplifier 31.

In step S13, the branch function unit 34a drops the optical signal coupled by the optical coupler 36a, and inputs the dropped optical signal to D/K input ports of each of the C-function units 35a and 35b. An optical signal dropped by the other branch function unit 34b is also input to the input ports of each of the C-function units 35a and 35b.

In step S14, optical signals output from B output ports of each of the C-function units 35a and 35b are transmitted to transponders 41a to 41n.

In step S15, the transponders 41a to 41n transmit such optical signals to communication devices 51a to 51n, respectively.

<Effects of First Embodiment>

The optical add/drop multiplexing device 30A according to the first embodiment includes the branch function units 34a to 34d connected to each of sets of the WSSs 22a to 22d connected to each of the routes 1 to D having a plurality of optical fibers. Here, the WSSs 22a to 22d drop optical signals having a plurality wavelengths among the optical signals having the respective wavelength transmitted through the optical fibers by wavelength division multiplexing. Further, the optical add/drop multiplexing device 30A includes the C-function units 35a to 35d as CD/CDC function units that transmit the optical signals branched by the branch function units 34a to 34d to the plurality of transponders.

The features of the first embodiment is to include the optical couplers 36a to 36d each connected to a set of K WSSs (for example, the WSSs 22c and 22d) each having 1 input port and M output ports and one of the branch function units (for example, the branch function unit 34a), K being a number of 2 or more, the number of couplers being equal to or greater than a positive integer obtained by dividing a numerical value D(M−D) by K, the numerical value being obtained by multiplying the number (M−D) of optical signals dropped by each of the WSSs 22c and 22d by the number D of all of the WSSs 22a to 22d. The optical coupler (for example, the optical coupler 36a) couples the plurality of optical signals of different wavelengths dropped by a set of WSSs connected to the optical coupler 36a into one optical signal and outputs the coupled optical signal to the branch function unit 34a.

According to the above configuration, the following effects can be obtained. Conventionally, the branch function units 34a to 34h (see FIG. 7) is connected to paths of the plurality of optical signals dropped by the respective WSSs 22a to 22d. In other words, the number of branch function units 34a to 34h to be used is 8 represented by a numerical value D(M−D) "4(6−4)" obtained by multiplying the number (M−D) "for example, 6−4" of optical signals dropped by each of the WSSs 22a to 22d by the number D "for example, 4" of all of the WSSs 22a to 22d.

In the embodiment, "4" optical couplers (for example, the optical coupler 36a) equal to or greater than a positive integer "4" obtained by dividing the numerical value D(M−D) "8" by a set of numbers K (for example, K=2) are connected between a set of WSSs (for example, WSSs 22c and 22d) and one branch function unit (for example, 34a). Since the branch function units 34a to 34d (FIG. 1) are connected to the four optical couplers 36a to 36d, respectively, the number of branch function units 34a to 34d can be reduced to four, which is half of the conventional 8 branch function units. In other words, the device cost of the branch function units 34a to 34d can be significantly reduced to half.

Conventionally, when the optical couplers are used for the branch function units 34a to 34h (FIG. 7), as the number of output branches of the branch function units 34a to 34h connected to the input ports of the C-function units 35a to 35d increases, power of the optical signals output from the optical couplers is attenuated. For this reason, the optical coupler cannot be used for the branch function units 34a to 34h. However, in the embodiment, since the number of branch function units 34a to 34d (FIG. 1) can be reduced as described above, the number of output branches of the branch function units 34a to 34d on the input ports of the C-function units 35a to 35d is reduced. Therefore, inexpensive optical couplers can be used for the branch function units 34a to 34d such that the power of the output optical signals is not attenuated, thereby the device cost can be reduced.

As described above, since the number of branch function units 34a to 34d (FIG. 1) can be reduced in the embodiment, the number of input ports can be reduced. Due to the reduction in the number of input ports, the loss of the power of the optical signals from the optical couplers can be reduced when the optical couplers are used for the C-function units 35a to 35d. For this reason, inexpensive optical couplers can be used for the C-function units 35a to 35d, and the device cost can be reduced. Therefore, it is possible to realize a configuration in which many transponders 41a to 44n can be connected to the optical add/drop multiplexing device 30A.

<Modification of First Embodiment>

Figure 3:
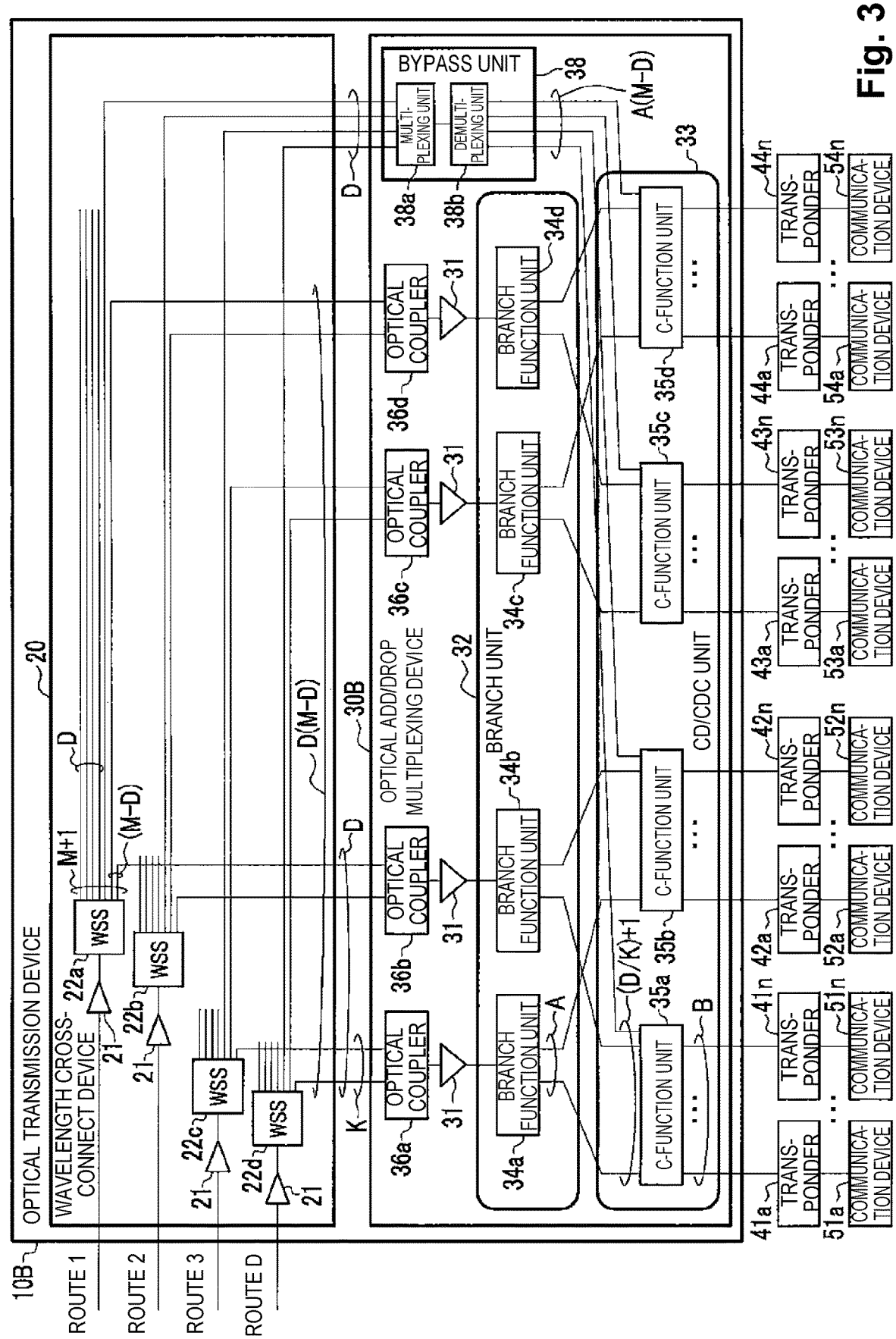
FIG. 3 is a block diagram showing a configuration of an optical transmission device including an optical add/drop multiplexing device according to a modification of the first embodiment of the present invention.

FIG. 3 is a block diagram showing a configuration of an optical transmission device including an optical add/drop multiplexing device according to a modification of the first embodiment of the present invention.

An optical add/drop multiplexing device 30B in an optical transmission device 10B of the modification shown in FIG. 3 differs from the optical add/drop multiplexing device 30A (FIG. 1) described above in that one output port for drop is additionally installed for each of the WSSs 22a to 22d connected to each of the routes 1 to D and a bypass unit 38 is connected between the four output ports additionally installed for each of the WSSs 22a to 22d and input ports of C-function units 35a to 35d. The bypass unit 38 includes a multiplexing unit 38a and a demultiplexing unit 38b. Further, the number of the input ports of each of the C-function units 35a to 35d is (D/K)+1 which is increased by one to (D/K). In FIG. 3, the WSSs 23a to 23d (see FIG. 1) on the output side are not shown.

An optical coupler or the WSS is applied to the multiplexing unit 38a and the demultiplexing unit 38b. The multiplexing unit 38a multiplexes optical signals dropped by the respective WSSs 22a to 22d into one optical signal, and outputs the optical signal to the demultiplexing unit 38b. The demultiplexing unit 38b demultiplexes the multiplexed optical signal and outputs the demultiplexed optical signals to the 1 input ports additionally installed for the C-function units 35a to 35d, respectively.

Here, it is assumed that there is a problem in that both optical signals dropped by the WSSs 22c and 22d and input to the optical coupler 36a are not output to the C-function units 35a and 35b for some reasons. In this case, both of the optical signals are output to the C-function units 35a and 35b via the bypass unit 38, so that the problem is eliminated.

Here, the number (number of Drops) of optical signals dropped to the branch function units 34a to 34d via the optical couplers 36a to 36d and the optical amplifiers 31 for each of the WSSs 22a to 22d in the routes 1 to D, is (M−D). The number (number of branches) of output ports of each of the branch function units 34a to 34d is A. From the number of Drops (M−D) and the number of branches A, the number of WSSs to be applied to the C-function units 35a to 35d is obtained as A(M−D). Accordingly, the number of output ports of the demultiplexing unit 38b is also A(M−D).

In a case of applying the numerical values quoted in the first embodiment, since M=6, D=4, and A=2, a value of 2×(6−4)=4 is derived, and the value of 4 corresponds to the number of output ports of the demultiplexing unit 38b of the bypass unit 38 and the number of WSSs of each of the C-function units 35a to 35d.

Practically, the numerical values such as M=100, D=40, and A=5 are large, and at this time, the number of WSSs becomes large as A(M−D)=5×(100−40)=300. The 300 output ports of the bypass unit 38 are connected to the input ports of the 300 WSSs of the C-function units 35a to 35d. Therefore, practically, even when the bypass unit 38 is added, only two WSSs of the multiplexing unit 38a and the demultiplexing unit 38b are added to the 300 pieces. For this reason, since only a very small proportion to the total number of WSSs of the optical add/drop multiplexing device 30B is added, the reduction of the device cost is not hindered. As described above, even when the bypass unit 38 is added, the total number of WSSs of the optical add/drop multiplexing device 30B can be reduced as described in the first embodiment, so that costs can be reduced.

In addition, even when optical couplers are applied to the multiplexing unit 38a and the demultiplexing unit 38b, respectively, since only a very small proportion to the total number of parts such as WSS is added as described above, the reduction of the device cost is not hindered.

<Configuration of Second Embodiment>

Figure 4:
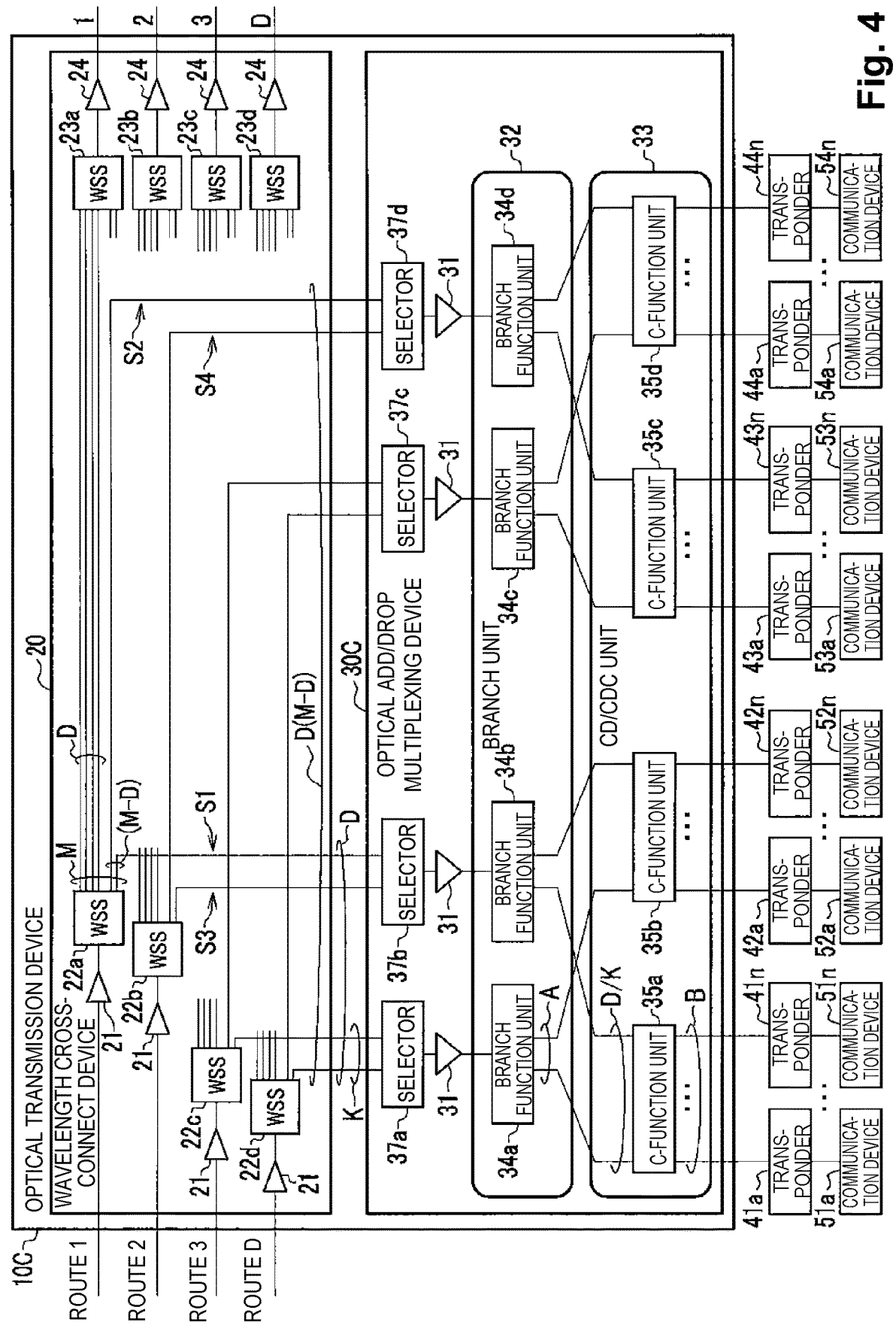
FIG. 4 is a block diagram showing a configuration of an optical transmission device including an optical add/drop multiplexing device according to a second embodiment of the present invention.

FIG. 4 is a block diagram showing a configuration of an optical transmission device including an optical add/drop multiplexing device according to a second embodiment of the present invention.

An optical add/drop multiplexing device 30C of an optical transmission device 10C shown in FIG. 4 differs from the optical add/drop multiplexing device 30A (FIG. 1) of the first embodiment in that selectors 37a to 37d are provided instead of the optical couplers 36a to 36d.

In the selectors 37a to 37d, a set of K selectors 37b and 37d, K being a number of 2 or more, is connected to paths for drop of a set of K WSSs 22a and 22b, K being a number of 2 or more, as one set. Therefore, the other set of selectors 37a and 37c having the same number K is connected to paths for drop of the other set of WSSs 22c and 22d. Hereinafter, the set of selectors 37b and 37d connected to the paths for drop of the WSSs 22a and 22b will be described as representatives.

As a prerequisite, out of two optical signals transmitted from a route 1 and dropped by the WSS 22a, one signal S1 is input to the selector 37b and the other signal S2 is input to the selector 37d. Further, out of the two optical signals transmitted from a route 2 and dropped by the WSS 22b, one signal S3 is input to the selector 37b and the other signal S4 is input to the selector 37d.

At this time, when one selector 37b selects the signal S1 dropped by the WSS 22a on the route 1, the other selector 37d performs a selection operation of selecting the signal S4 dropped by the WSS 22b on the route 2.

By such a selection operation, the optical signal S1 from the route 1 can be input to the C-function units 35a and 35b from the selector 37b via the optical amplifier 31 and the branch function unit 34b. In addition, the optical signal S4 from the route 2 can be input to the C-function units 35c and 35d from the selector 37d via the optical amplifier 31 and the branch function unit 34d. The input optical signals are transmitted from the C-function units 35a to 35d to the communication devices 51a to 54n via the transponders 41a to 44n, respectively.

The other selectors 37a and 37c can select signals in the same manner, and optical signals from routes 3 and D can be input to the C-function units 35a to 35d. The input optical signals are transmitted from the C-function units 35a to 35d to the communication devices 51a to 54n via the transponders 41a to 44n, respectively.

<Operation of Second Embodiment>

An optical add/drop operation of the optical transmission device 10C including the optical add/drop multiplexing device 30C according to the second embodiment will be described below with reference to a flowchart shown in FIG. 5.

Figure 5:
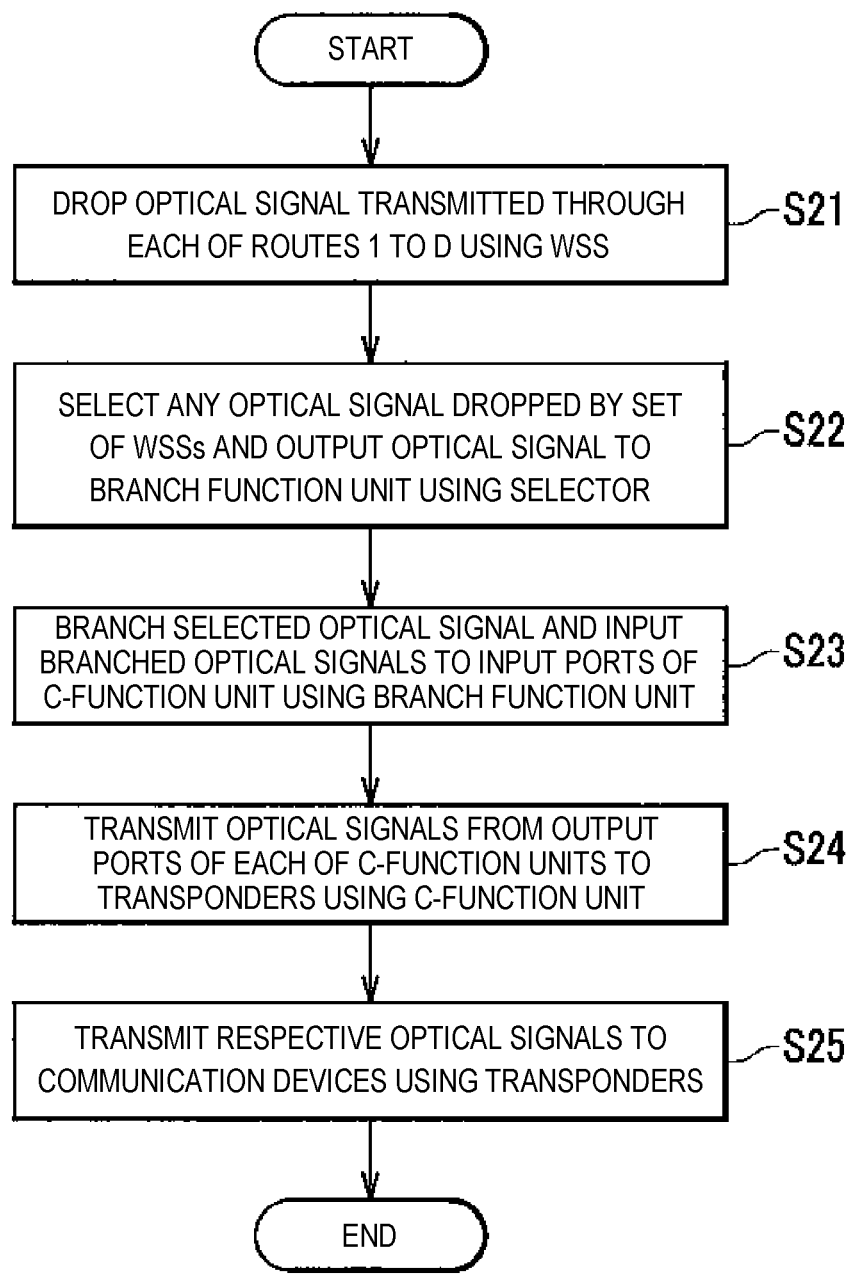
FIG. 5 is a flowchart illustrating an optical add/drop operation of the optical transmission device including the optical add/drop multiplexing device according to the second embodiment.

In step S21 shown in FIG. 5, the drop port of each of the WSSs 22a to 22d drops the optical signal, which is transmitted through each of the routes 1 to D, for each of wavelengths λ1 to λn. The dropped optical signals are input to the selectors 37a to 37d, respectively.

In step S22, one set of selectors (for example, the selectors 37b and 37d) selects any optical signal dropped by one set of WSSs 22a and 22b and outputs the selected optical signal to the branch function unit 34b. At this time, when one selector 37b of the set of selectors selects the optical signal S1 dropped by any one WSS 22a, the other selector 37d selects the optical signal S4 dropped by the other WSS 22b. The selected optical signals S1 and S4 are input to the branch function units 34b and 34d, respectively.

In step S23, the branch function unit (for example, the branch function unit 34b) drops the optical signal S1 selected by the selector 37b, and inputs the dropped optical signal to D/K input ports of each of the C-function units 35a and 35b. The optical signal selected by the other branch function unit 34a is also input to the input ports of each of the C-function units 35a and 35b.

In step S24, optical signals output from B output ports of each of the C-function units 35a and 35b are transmitted to transponders 41a to 41n.

In step S25, the transponders 41a to 41n transmit such optical signals to communication devices 51a to 51n, respectively.

<Effects of Second Embodiment>

The optical add/drop multiplexing device 30C according to the second embodiment includes the selectors 37a to 37d having the number satisfying the following condition and each connected between a set of K WSSs (for example, the WSSs 22c and 22d) each having 1 input port and M output ports and one of the branch function units (for example, the branch function unit 34a), K being a number of 2 or more. Here, the number is equal to or greater than a positive integer obtained by dividing the numerical value D(M−D) by K described above, the numerical value being obtained by multiplying the number (M−D) of optical signals dropped by each of the WSSs 22c and 22d by the number D of all of the WSSs 22a to 22d.

The selectors (for example, the selectors 37b and 37d) select any one of the optical signals dropped by the set of WSSs 22a and 22b and output the selected optical signal to the branch function unit 34b. Further, when one selector 37b of the set of selectors selects the optical signal S1 dropped by one WSS 22a of the set of WSSs, the other selector 37d selects the optical signal S4 dropped by the other WSS 22b.

According to such a configuration, the optical add/drop multiplexing device 30C can be realized by the configuration in which the optical couplers 36a to 36d (FIG. 1) of the first embodiment are simply replaced with the selectors 37a to 37d of the second embodiment. For this reason, when the selectors 37a to 37d are used, the number of optical amplifiers 31 and the number of branch function units 34a to 34d can be reduced by 1/K. Further, the number of input ports of each of C-function units 35a to 35d can be reduced to D/K. Therefore, similarly to the first embodiment, it is possible to realize a configuration in which many transponders 41a to 44n can be connected to the optical add/drop multiplexing device 30C at low cost.

<Modification of Second Embodiment>

Figure 6:
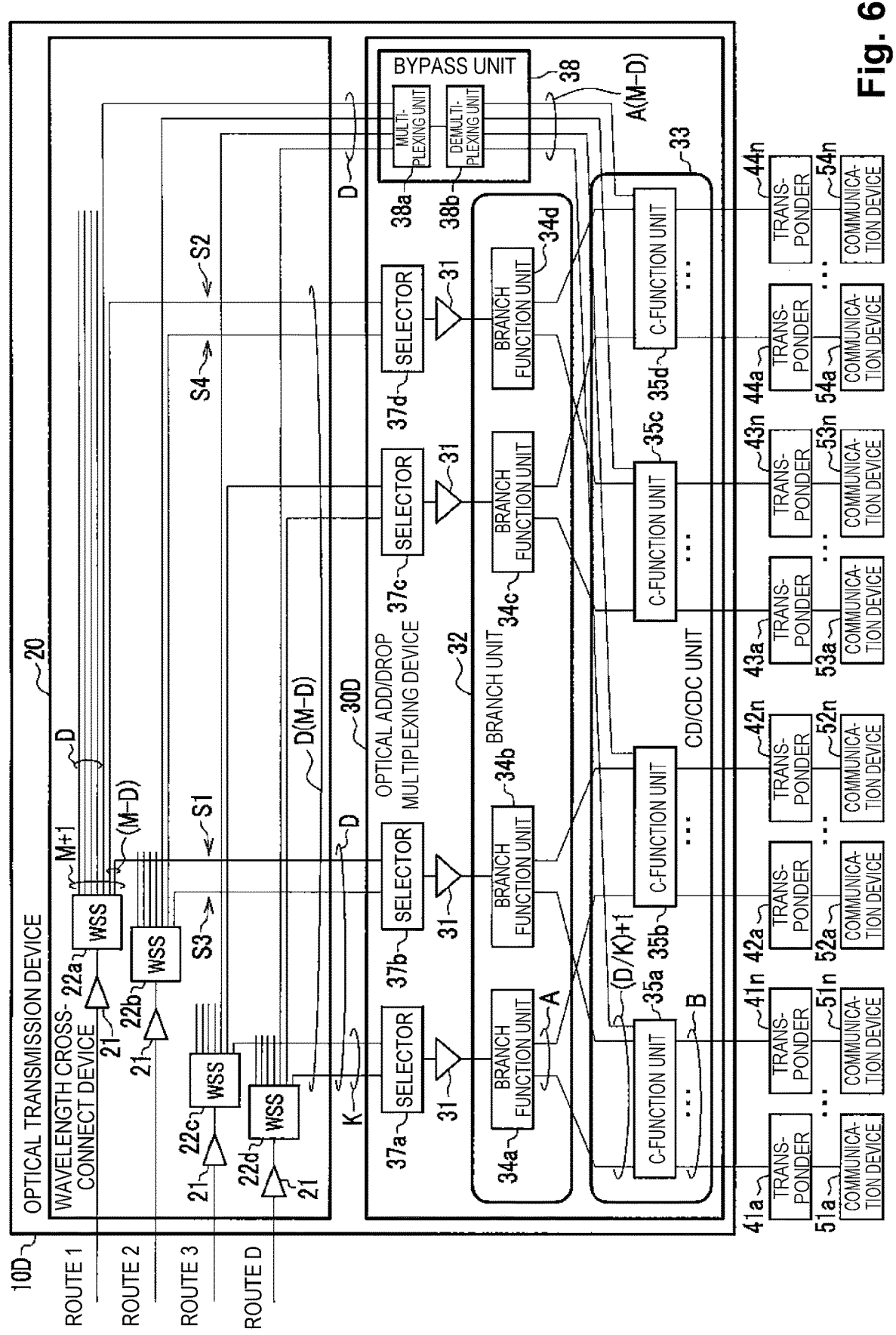
FIG. 6 is a block diagram showing a configuration of an optical transmission device including an optical add/drop multiplexing device according to a modification of the second embodiment of the present invention.

FIG. 6 is a block diagram showing a configuration of an optical transmission device including an optical add/drop multiplexing device according to a modification of the second embodiment of the present invention.

An optical add/drop multiplexing device 30D in an optical transmission device 10D of the modification shown in FIG. 6 differs from the optical add/drop multiplexing device 30C (FIG. 4) described above in that one output port for drop is additionally installed for each of the WSSs 22a to 22d connected to each of the routes 1 to D and a bypass unit 38 is connected between the total of four output ports additionally installed and input ports of C-function units 35a to 35d. The bypass unit 38 includes a multiplexing unit 38a and a demultiplexing unit 38b. Further, the number of the input ports of each of the C-function units 35a to 35d is (D/K)+1, which is increased by one to (D/K). In FIG. 6, the WSSs 23a to 23d (see FIG. 4) on the output side are not shown.

For example, it is assumed that the optical signals S1 and S21 dropped by one WSS 22a of the set of WSSs 22a and 22b are not selected by the selectors 37b and 37d and are not output to the C-function units 35a to 35d. Even in this case, the optical signals S1 and S2 can be output to the C-function units 35a to 35d via the bypass unit 38.

In the bypass unit 38 configured to compensate for the non-selection by the selectors 37a to 37d, the number of output ports of the demultiplexing unit 38b is also A(M−D) as in the configuration of the modification of the first embodiment described above (FIG. 3). Similarly, the number of WSSs when the WSS is applied to the C-function units 35a to 35d is also A(M−D). For this reason, as described in the modification of the first embodiment, the number of WSSs of the entire optical add/drop multiplexing device 30D can be reduced, so that the cost can be reduced. When an inexpensive optical coupler is applied to each of the multiplexing unit 38a and the demultiplexing unit 38b, the same effect and further cost reduction effect can be obtained Other specific configurations can be appropriately changed without departing from the gist of the present invention.

REFERENCE SIGNS LIST 10A, 10B, 10C, 10D Optical transmission device
20 Wavelength cross-connect device
21, 24, 31 Optical amplifier
22a to 22d, 23a to 23d WSS
30A, 30B, 30C, 30D Optical add/drop multiplexing device
32 Branch unit
33 CD/CDC unit
34a to 34h Branch function unit
35a to 35d C-function unit (CD/CDC function unit)
36a to 36d Optical coupler
37a to 37d Selector
41a to 44n Transponder
51a to 54n Communication device
38 Bypass unit
38a Multiplexing unit
38b Demultiplexing unit

The invention claimed is:

1. An optical add/drop multiplexing device comprising:
branch function units, including one or more processors, connected to each of WSSs (Wavelength Selective Switches) connected to respective routes, each route i) having a plurality of optical fibers and ii) dropping a subset of optical signals having different wavelengths included in original optical signals having a plurality of wavelengths and being transmitted through the optical fibers by wavelength division multiplexing, wherein the dropped subset of optical signals includes M-D signals, where M is the number of output ports of each WSS, and D is the number of optical paths between the input WSS and the output WSS, wherein an output port for drop is additionally installed for each of the WSSs resulting in that each WSS has a total of M+1 output ports;
CD/CDC (Colorless and Directionless/Colorless, Directionless and Contentionless) function units, including one or more processors, configured to transmit the dropped subset of optical signals that is branched by the branch function units to a plurality of transponders;
a bypass unit, including one or more processors, is configured to be connected between the output port additionally installed and input ports of the CD/CDC function unit and transmit the optical signal by each of the WSSs to the CD/CDC function unit; and
optical couplers each connected between i) a set of K WSSs each having 1 input port and M output ports, K being a number of 2 or more indicating the number of input ports of each optical coupler, and ii) one of the branch function units, the number of optical couplers being equal to or greater than a positive integer obtained by dividing a numerical value D(M-D) by K, the numerical value D(M-D) being obtained by multiplying the number (M-D) of optical signals dropped by each of the WSSs by the number D, wherein
the optical coupler is configured to couple the subset of optical signals of different wavelengths dropped by the set of WSSs connected to the optical coupler into one coupled optical signal and output the one coupled optical signal to the branch function unit.

2. An optical add/drop multiplexing device comprising:
branch function units, including one or more processors, connected to each of WSSs connected to respective routes, each route i) having a plurality of optical fibers and ii) dropping a subset of optical signals having different wavelengths included in original optical signals having a plurality of wavelengths and being transmitted through the optical fibers by wavelength division multiplexing, wherein the dropped subset of optical signals includes M-D signals, where M is the number of output ports of each WSS, and D is the number of optical paths between the input WSS and the output WSS, wherein an output port for drop is additionally installed for each of the WSSs resulting in that each WSS has a total of M+1 output ports;
CD/CDC function units, including one or more processors, configured to transmit the dropped subset of optical signals that is branched by the branch function units to a plurality of transponders;
a bypass unit, including one or more processors, is configured to be connected between the output port additionally installed and input ports of the CD/CDC function unit and transmit the optical signal by each of the WSSs to the CD/CDC function unit; and
selectors each connected between i) a set of K WSSs each having 1 input port and M output ports, K being a number of 2 or more indicating the number of input ports of each selector, and ii) one of the branch function units, the number of selectors being equal to or greater than a positive integer obtained by dividing a numerical value D(M-D) by K, the numerical value D(M-D) being obtained by multiplying the number (M-D) of optical signals dropped by each of the WSSs by the number D, wherein
the selector is configured to select any one of the optical signals dropped by the set of WSSs and output the selected optical signal to the branch function unit, and when one selector of the selectors selects a first optical signal dropped by one of the set of WSSs, the other selector selects a second optical signal dropped by another WSS.

3. An optical add/drop multiplexing method of an optical add/drop multiplexing device including:
branch function units connected to each of WSSs connected to respective routes, each route i) having a plurality of optical fibers and ii) dropping a subset of optical signals having different wavelengths included in original optical signals having a plurality of wavelengths and being transmitted through the optical fibers by wavelength division multiplexing, wherein the dropped subset of optical signals includes M-D signals, where M is the number of output ports of each WSS, and D is the number of optical paths between the input WSS and the output WSS, wherein an output port for drop is additionally installed for each of the WSSs resulting in that each WSS has a total of M+1 output ports, CD/CDC function units configured to transmit the dropped subset of optical signals that is branched by the branch function units to a plurality of transponders, a bypass unit configured to be connected between the output port additionally installed and input ports of the CD/CDC function unit and transmit the optical signal by each of the WSSs to the CD/CDC function unit, and optical couplers each connected between i) a set of K WSSs each having 1 input port and M output ports, K being a number of 2 or more indicating the number of input ports of each optical coupler, and ii) one of the branch function units, the number of optical couplers being equal to or greater than a positive integer obtained by dividing a numerical value D(M-D) by K, the numerical value D(M-D) being obtained by multiplying the number (M-D) of optical signals dropped by each of the WSSs by the number D, the optical coupler executing: coupling the subset of optical signals of different wavelengths dropped by the set of WSSs connected to the optical coupler into one coupled optical signal and outputting the coupled one optical signal to the branch function unit.

* * * * *